United States Patent

Rondier

Patent Number: 5,521,450
Date of Patent: May 28, 1996

[54] SLIP RING UNIT FOR FITTING TO AN ALTERNATOR, ESPECIALLY FOR A MOTOR VEHICLE

[75] Inventor: Patrick Rondier, Montmagny, France

[73] Assignee: Valeo Equipements Electriques Moteur, Creteil, France

[21] Appl. No.: 304,236

[22] Filed: Sep. 12, 1994

[30] Foreign Application Priority Data

Sep. 16, 1993 [FR] France .................... 93 11042

[51] Int. Cl.⁶ ........................................ H01R 39/08
[52] U.S. Cl. ................... 310/232; 310/42; 310/235
[58] Field of Search ........................ 310/232, 219, 310/42, 236, 43, 235, 71, 234, 233; 29/597

[56] References Cited

U.S. PATENT DOCUMENTS

| | | | |
|---|---|---|---|
| 3,185,878 | 5/1965 | Reisnecker | 310/232 |
| 4,535,264 | 8/1985 | Allport | 310/232 |
| 4,618,793 | 10/1986 | Shizuka | |

FOREIGN PATENT DOCUMENTS

| | | |
|---|---|---|
| 0094163 | 4/1983 | European Pat. Off. |
| 0081445 | 6/1983 | European Pat. Off. |
| 3130595 | 2/1983 | Germany |
| 3510489 | 8/1984 | Germany |
| 8814194 | 11/1988 | Germany |
| 0891994 | 3/1962 | United Kingdom |
| 2091497 | 7/1982 | United Kingdom |

*Primary Examiner*—R. Skudy
*Attorney, Agent, or Firm*—Morgan & Finnegan

[57] ABSTRACT

A separate slip ring unit for fitting to an alternator, especially a motor vehicle alternator, has a body of insulating material moulded over electrically conductive elements of the unit. It comprises a first cylindrical body portion with slip rings, a second body portion having elements for electrical connection to the alternator winding, and an intermediate body portion joining the first and second body portions together. The intermediate portion has two branches, including a conductive linking portion embedded in the insulating material. The second body portion comprises a ring of insulating material, made integrally by moulding to a diameter substantially greater than that of the first body portion, and each branch of the intermediate portion comprises a first portion which extends the first body portion, together with a second portion which is divergent radially up to the ring.

11 Claims, 4 Drawing Sheets

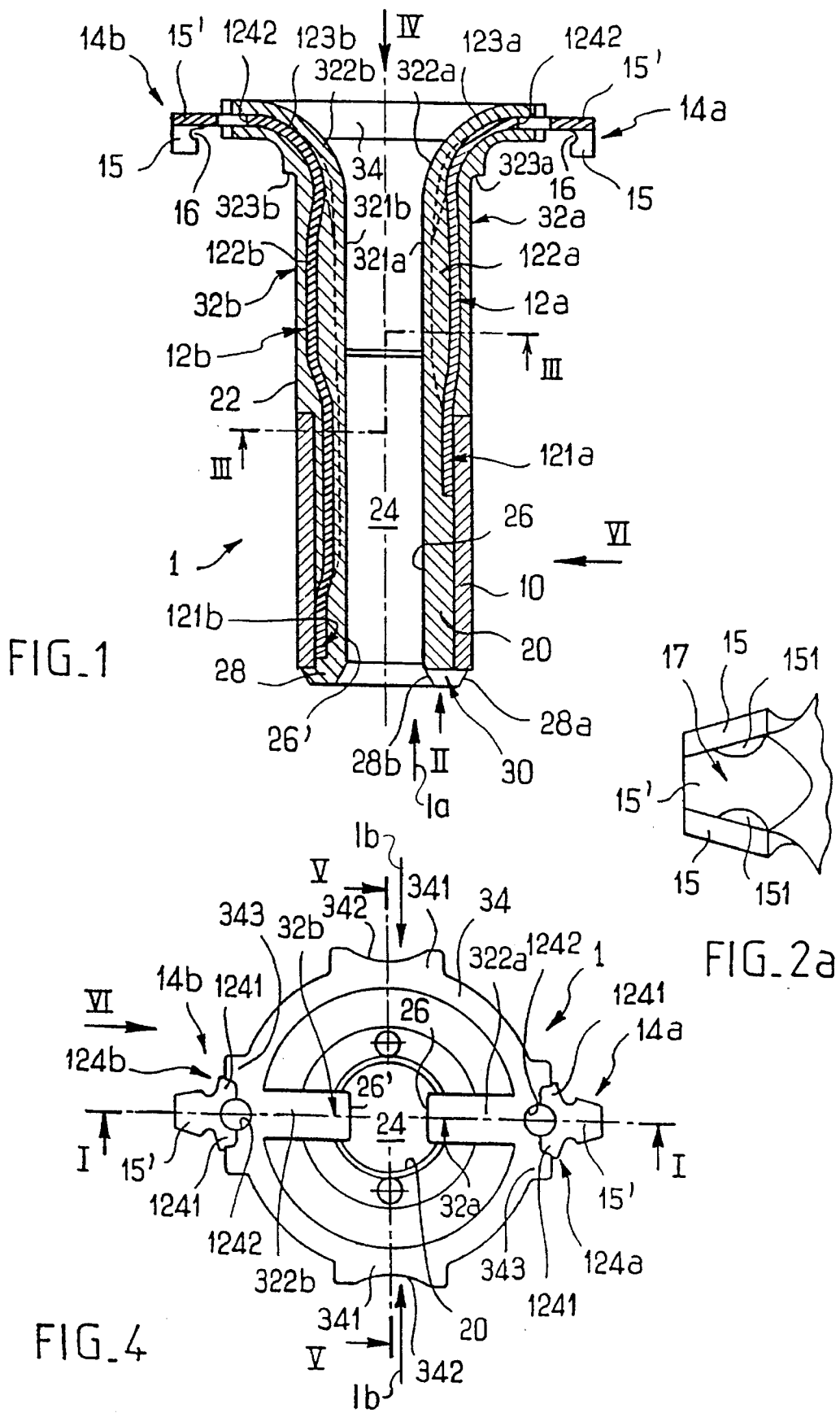

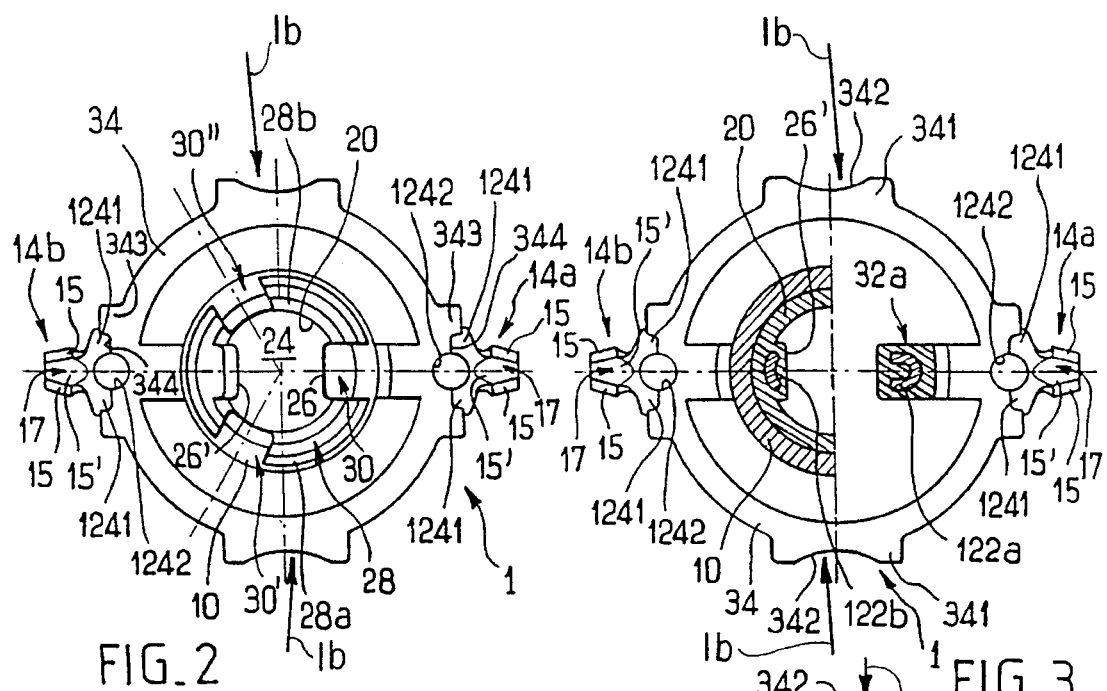
FIG._2  FIG._3
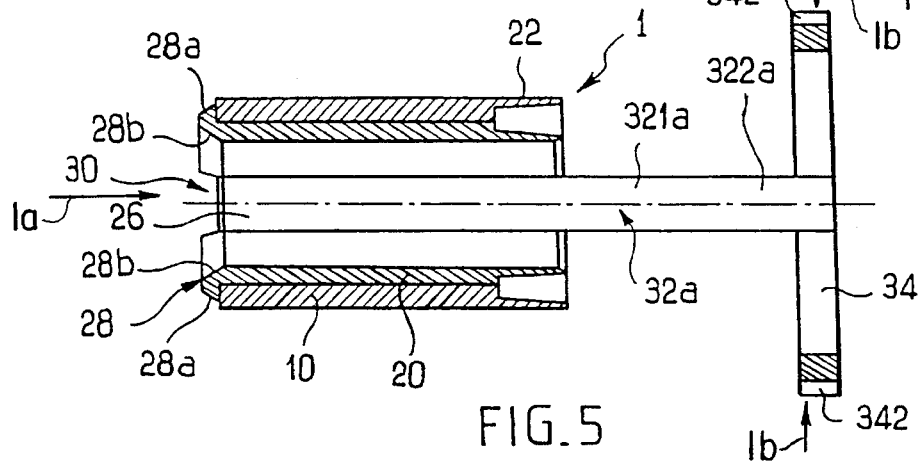
FIG._5
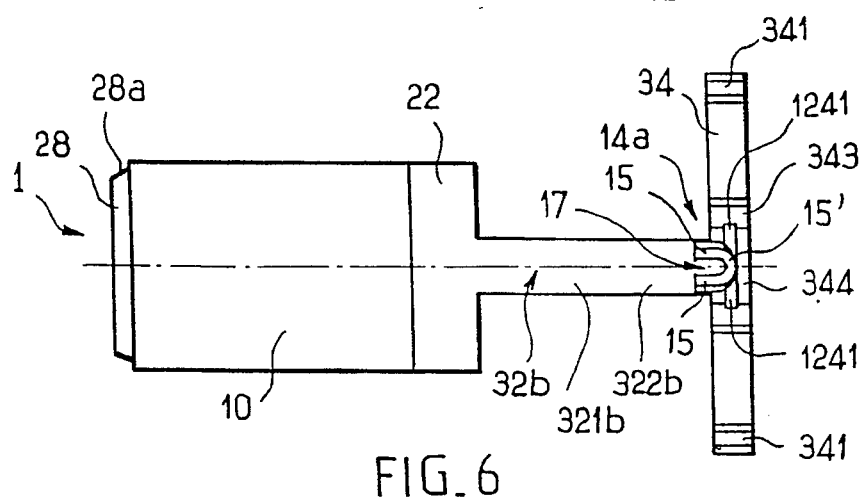
FIG._6

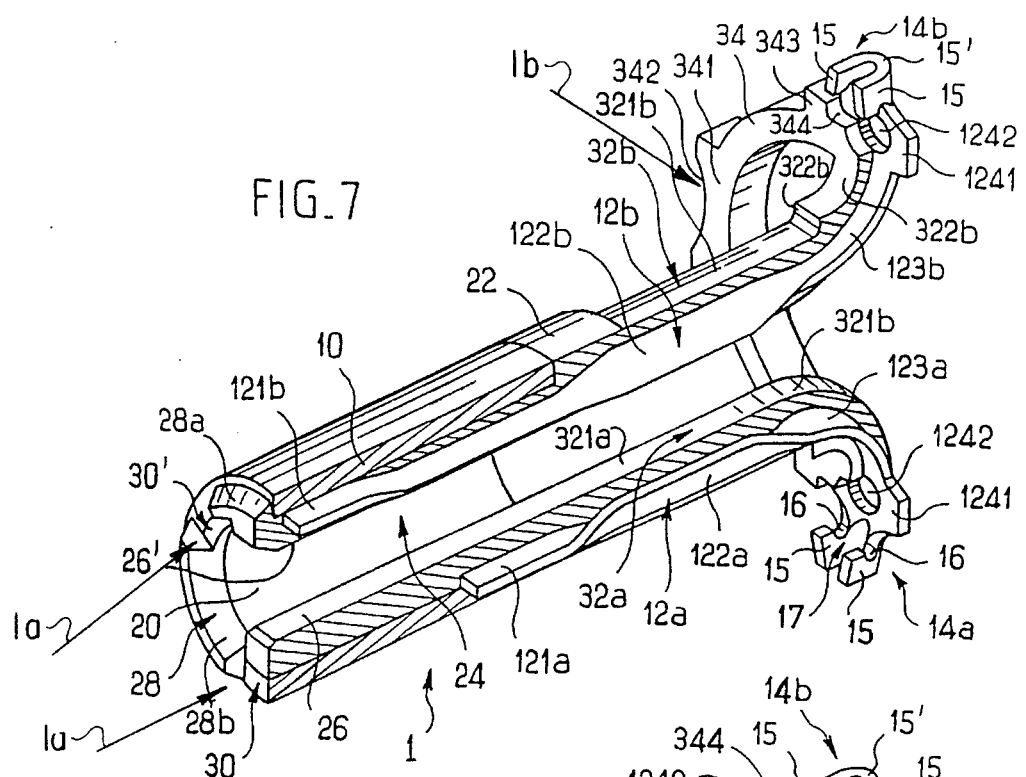
FIG_7
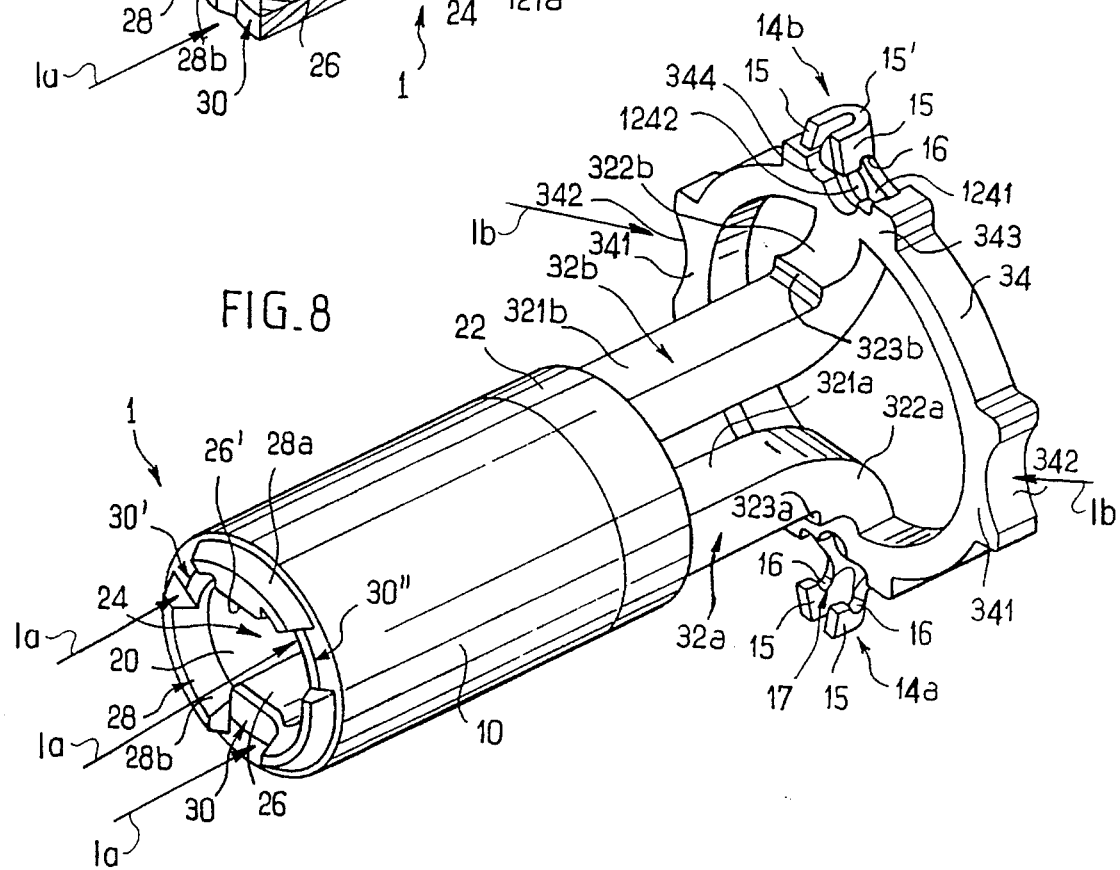
FIG_8

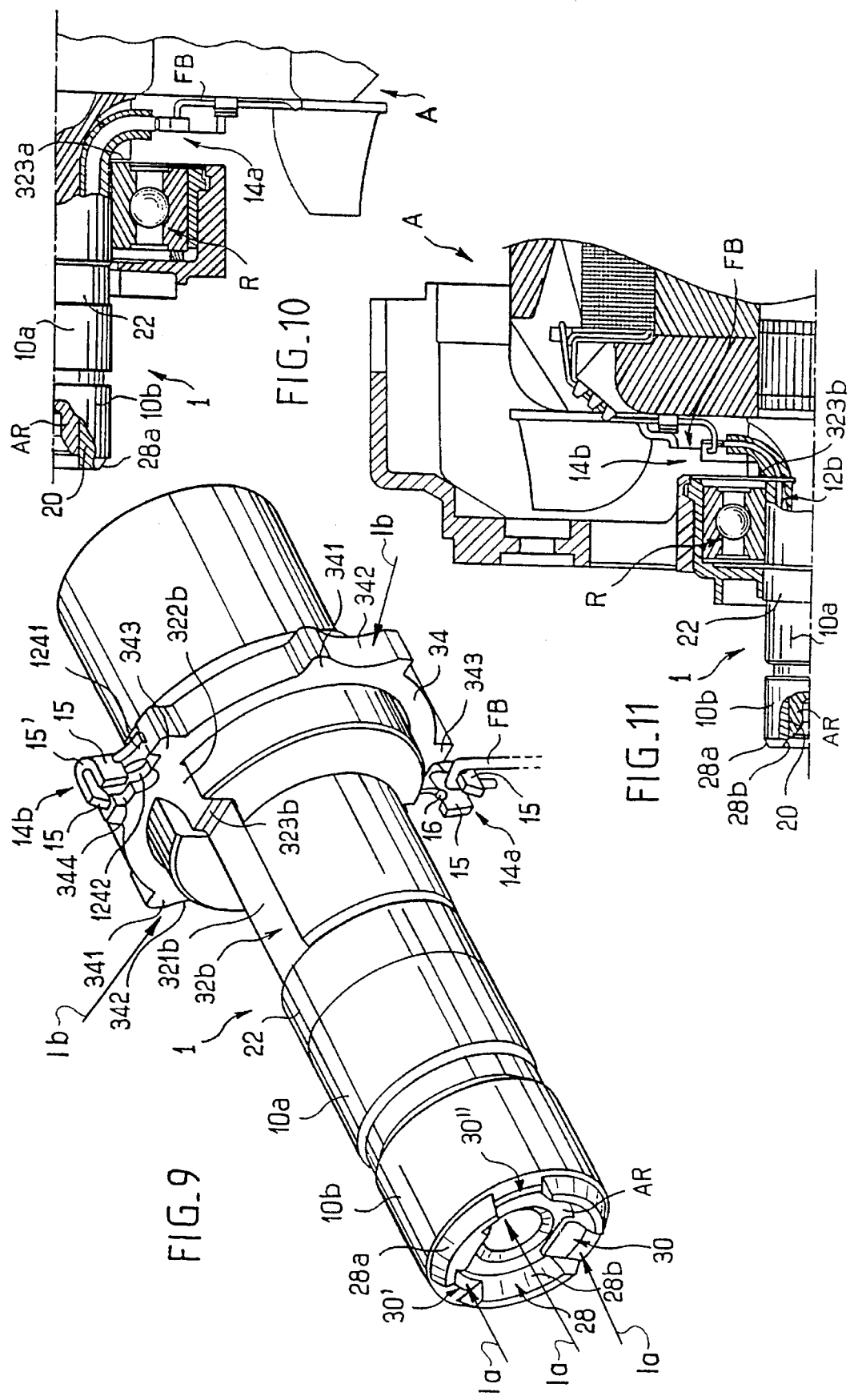

5,521,450

SLIP RING UNIT FOR FITTING TO AN ALTERNATOR, ESPECIALLY FOR A MOTOR VEHICLE

FIELD OF THE INVENTION

The present invention relates in general terms to alternators, and in particular to alternators for motor vehicles. More particularly, it is concerned with slip ring or collector units for connection with the excitation winding of such an alternator.

BACKGROUND OF THE INVENTION

It is conventional during the manufacture of an alternator to form the slip rings directly on a projecting part of the alternator shaft.

Another known technique consists in making the slip ring unit, or collector, as a separate component, using for example a method whereby the body of the component is moulded on to its electrically conductive parts. The slip ring unit is subsequently fitted on to the shaft of the alternator, typically by force fitting.

Such a slip ring unit, formed in the known way as a separate component, comprises a generally cylindrical first body portion which includes two slip rings at its outer surface, a second body portion which includes two connecting elements for making electrical connection with the wire ends of the winding wires of the alternator, and an intermediate body portion which provides electrical and mechanical connection between the first and second body portions. This intermediate body portion is in the form of two branches, each of which comprises a conductive portion for providing a link between a corresponding slip ring and a connecting element which is embedded in the insulating material of the body.

DISCUSSION OF THE INVENTION

An object of the invention is to provide a slip ring unit or collector of an improved kind for fitting to an alternator, in particular in terms of requiring a reduced amount of insulating material, while at the same time providing reliable and accurate positioning of the connecting elements, and facilitating both the gripping and orientation of the slip ring unit during automatic fitting of the latter on to the alternator by means of a robotic machine.

According to the invention in a first aspect a slip ring unit for attachment to an alternator, especially for a motor vehicle, of the type made by moulding an insulating material on to electrically conductive elements, and comprising a generally cylindrical first body portion having two slip rings at its outer surface, a second body portion having two connecting elements for electrical connection with the wire ends of a winding, and an intermediate body portion for linking the said first and second portions together electrically and mechanically, the intermediate body portion comprising two arms, each of which includes a conductive portion for providing a link between a slip ring and a connecting element embedded in the insulating material, is characterised in that the said second body portion of the slip ring unit comprises a ring of insulating material made integrally by moulding and having a diameter which is substantially greater than that of the said first body portion, and in that each of the said branches has a first portion extending the first body portion, together with a second portion which is divergent radially up to the said ring.

According to a preferred feature of the invention, the said connecting elements extend radially outwardly as extensions of the said branches.

According to another preferred feature of the invention, the said ring has means adapted to be gripped by a robotic machine.

According to yet another preferred feature of the invention, the said means include two diametrically opposed concave surfaces.

According to a still further preferred feature of the invention, the said concave surfaces are formed in integral thickened portions of the ring offset by 90° with respect to the said connecting elements.

According to another preferred feature of the invention, lateral anchor lugs are arranged at the transition between the connecting elements and the linking portions, the anchor lugs being anchored in integral thickened portions of the ring.

According to a further preferred feature of the invention, a hole is provided at the transition between the connecting elements and the receptive linking portions, for positioning the latter before the moulding operation.

Preferably, each said branch includes on an outer face a shoulder defining an abutment for a bearing of the alternator shaft.

According to yet another preferred feature of the invention, each conductive linking portion has, at least locally, a generally U-shaped cross section.

Preferably, tile said generally cylindrical first body portion has a central bore in which two diametrically opposed spline elements are formed by moulding, and internal and lateral surfaces of the said branches define extensions of internal and lateral surfaces of the said spline elements.

Preferably, tile said second portions of the arms have a general profile of a quarter of a circle.

According to the invention in a second aspect, an alternator, especially for a motor vehicle, is characterised in that a slip ring unit according to the said first aspect of the invention is fitted on a projecting shaft of the alternator.

Further aspects, objects and advantages of the present invention will appear more clearly on a reading of the detailed description of a preferred embodiment of the invention which follows, and which is given by way of non-limiting example only and with reference to the accompanying drawings.

BRIEF DESCRIPTION OF THE DRAWINGS

FIG. 1 is a view in axial cross section taken on the line I—I in FIG. 4, showing a member which is adapted to constitute a collector or slip ring unit for an alternator in accordance with the invention.

FIG. 2 is an end view seen in the direction of the arrow II in FIG. 1.

FIG. 2a is a view on a larger scale, showing part of FIG. 2.

FIG. 3 is a view in transverse cross section taken on the line III—III in FIG. 1.

FIG. 4 is an end view in the direction of the arrow IV in FIG. 1.

FIG. 5 is a view in axial cross section taken on the line V—V in FIG. 4.

FIG. 6 is a view in elevation in the direction of the arrow VI in FIG. 4.

FIG. 7 is a perspective view, partly cut away, of the slip ring unit seen in FIGS. 1 to 6.

FIG. 8 is a perspective outside view of the slip ring unit shown in FIGS. 1 to 7.

FIG. 9 is a perspective view of the slip ring unit shown in FIGS. 1 to 8, when connected and mounted on an alternator.

FIG. 10 is a view in vertical axial cross section of part of a first type of alternator equipped with the slip ring unit shown in FIGS. 1 to 8.

FIG. 11 is a view in vertical axial cross section showing part of a second type of alternator equipped with the slip ring unit shown in FIGS. 1 to 8.

DESCRIPTION OF A PREFERRED EMBODIMENT OF THE INVENTION

Reference will first be made to FIGS. 1 to 8, in which a component which constitutes a collector or slip ring unit for an alternator is shown in an intermediate step in its manufacture.

The competent or slip ring unit is generally indicated at 1, and is made by moulding a suitable plastics material, preferably of a thermosetting type, on to electrically conductive elements, which are made of copper, for example. These latter consist, firstly, of two cylindrical slip rings for contact with brushes in the usual way, secondly, two electrical connecting elements for connection with two ends of a rotor winding of the alternator, and thirdly, two electrical linking elements for connection between the two slip rings and the two connecting elements.

In the conventional way, the cylindrical slip rings are initially in the form of a single hollow copper cylinder 10 which, at the end of the manufacturing process of the slip ring unit, is divided circularly over its whole thickness in its middle region so as to form two slip rings 10a and 10b, which are electrically insulated from each other as is best seen in FIG. 9.

The above mentioned connecting elements are indicated respectively at 14a and 14b in various Figures of the drawings. They comprise two lugs 15 in face to face relationship, which define between them a flared central channel 17 (see for example FIG. 6). The lugs 15 are connected together through a portion 15' which has the form of a sector of a frustum of a cone and which defines the base of the channel 17. The latter is arranged to receive one end of the winding. Each of the associated electrical linking elements, indicated in FIG. 1 at 12a and 12b respectively, extends radially inwardly from the narrowest side of the associated lug 15.

Each lug 15 has a slot in the region of the base of the channel 17, formed on the edge of the lug which is directed radially inwardly, and in this example this slot 16 is semi-circular. In addition, and as is best seen in FIG. 2a, each lug 15 has a generally rounded boss 151 on its inner face, this boss being preferably made by press forming. Its purpose will be explained later on.

FIG. 9 shows the end (or "wire end") of a winding wire FB, which has been fitted in the connecting element 14a. In this example the slip ring unit 1 is in an angular position such that the two connecting elements 14a and 14b are aligned vertically. The wire end is bent through 180°, and the downwardly directed free terminal wire portion of the wire end is engaged in the channel defined between the lugs 15, while its intermediate portion comprising the 180° bend, is lodged in one of the slots 16. Using a suitable tool, the two lugs are subsequently pressed towards each other, so that they then grip the free wire portion of the wire end. This step is followed by soldering, which is carried out for example electrically. It will be observed that, in the context of an automated operation to make this connection, the presence of the bosses 151 enables the degree of gripping of the wire to be easily detected, so that it is adequate to enable the subsequent operation of electric welding to be carried out satisfactorily. More precisely, the bosses 151 enable any cutting of the wire by the sharp edges of the lugs 15 to be avoided during the gripping operation. The construction of the connecting element, such as the element 14a, has a number of advantages. First of all, the flared shape of the channel 17 which is delimited by the lugs 15 and the base 15' exerts a guiding force during the introduction of the free end of the wire. This flared shape also enables any undue squeezing effect, during the bending of the lugs 15 so as to effect the gripping action, to be avoided due to the fact that the channel 17 has its greatest width at the level of the junction between the element 14a or 14b with the remainder of the metallic component.

Subsequently, before gripping by the lugs 15 takes effect, the slot 16 which receives the bent portion of the wire ensures that the wire is stabilised in the position shown in FIG. 9, so as in particular to prevent the latter from separating from the channel through the open side of the latter.

Finally, the lugs 15 ensure firm gripping, but not cutting or nicking, of the wire, so ensuring good mechanical retention before the soldering step.

It should be noted here that a wire gripping element such as that described above also finds application in fields other than that between a slip ring unit and a winding of an alternator.

Each of the linking elements 12a and 12b has a linking element portion in the form of part of a cylinder, indicated at 121a and 121b respectively in FIG. 1. This cylindrical portion is welded on to the internal face of the portion 10 which is adapted to constitute the ship rings. In addition, each linking element 12a, 12b has a generally straight intermediate portion or linking portion 122a, 122b respectively, and a second intermediate portion or linking portion of flat cross section, indicated at 123a and 123b respectively. The cross section of each first intermediate portion or linking portion 122a, 122b is U-shaped, at lea:It over a substantial portion of its length, as can be seen in particular in the right hand part of FIG. 3 and in FIG. 7, this portion being offset radially inwardly with respect to the respective associated portion or conductive pad 121a or 121b. The flat second intermediate portion or linking portion 123a, 123b is bent over an angle of about 90°, and that one of its ends which is oriented radially is extended into the respective connecting element 14a or 14b. The variations in profile of the portions or conductive pads and linking 121a, 123a, and portions, respectively 121b, 123b, occur progressively.

It will be noticed here that the portions or conductive pads 121a and 121b are welded to the portion 10 respectively in the region of the latter which is close to the linking elements 12a and 12b, and in its region remote from these latter, in such a way that after the portion 10 has been divided as mentioned above, the connecting element 14a is only connected to the slip ring 10a, while the connecting element 14b is only connected to the slip ring 10b.

It will also be noted that the U-shaped cross section of the straight intermediate portions enables the rigidity of these latter to be increased, in order to minimise any danger of accidental departure from their correct positions during the moulding stage, and in particular in order to avoid any risk of a short circuit between the portion of the cylinder 10 which is to become the inner slip ring 10a and the adjacent intermediate portion or linking portion 122b.

It will be observed in addition that each curved intermediate portion or linking portion 123a, 123b includes, in the vicinity of the respective connecting element 14a or 14b, a wider region indicated at 124a and 124b respectively (see FIG. 4). These wider regions define two lateral anchor lugs 1241. A circular through hole 1242 is formed in these anchor lugs. This hole is arranged to cooperate with fixed or movable means in the mould, in such a way as to give precise positioning of the connecting elements 14a and 14b during the moulding step.

The body of plastics material formed in the step of moulding them on to the above mentioned conductive parts of the slip ring unit will now be described. First of all there is a generally cylindrical body portion 20 which extends within the copper cylinder 10, completely covering its inner face and also the conductive pads 121a, 121b and the parts of the intermediate portions or linkage portions 122a and 122b that lie within the cylindrical portion 20. The latter is extended towards the connecting elements 14a and 14b by another cylindrical body portion 22, the outer surface of which is flush with the outer surface of the copper cylinder 10.

The two cylindrical body portions 20 and 22 together define a central cylindrical bore 24, which has two grooves of generally rectangular cross section, 26, 26' extending along its entire length. These grooves are diametrically opposed to each other, and occupy the same angular postions with respect to the axis of the slip ring unit as the connecting elements 14a and 14b. This grooved bore is designed to receive a shaft of the alternator, having a complementary shape, so that the slip ring unit 1, which is force-fitted on the alternator shaft, is splined to the latter.

On the side opposed to the cylindrical body portion 22, the cylindrical body portion 20 is extended by a small collar 28 which has chamfered outer and inner edges indicated at 28a and 28b respectively. Three notches 30, 30' and 30" are formed in the collar 28 as shown in FIG. 2. The depth of these notches is equal to the length of the collar 28 in the axial direction, that is to say the base of each notch leaves the edge of the copper cylinder 10 exposed.

The notch 30 is aligned on the lower spline groove 26, while the other two notches 30' and 30" are offset angularly, in this example by 120°, on either side of the notch 30.

It will be understood that the copper cylinder 10 is firmly trapped in the axial direction between the portions 22 and 28 of the plastics body.

The notches 30, 30' and 30" have a double function. Firstly, the force-fitting of the component or slip ring unit 1 on to the alternator shaft is carried out, typically in an automated process, by exerting a very large axial force on the component 1 from the same side as the collar 28. The three notches 30, 30' and 30" are arranged to receive three pressure fingers of the automatic or robotic machine as illustrated schematically through the arrows 1a in FIGS. 1, 5, 7, 8 and 9, which then exerts the axial force on the component by engaging not on the body of plastics material, but on that edge of the metallic cylinder 10 which is directed towards the collar 28. As a result, this force is applied without any danger of damage to the plastics body material of the slip ring unit, the mechanical strength of which is of course substantially smaller than that of the copper.

In addition, the three notches enable the angular position of the slip ring unit 1 on the alternator to be maintained before it is force-fitted on to the latter.

It will be noted here that the two ends of the rotor winding of the alternator correspond respectively to the inner side of the winding ("current entry side") and to an outer side of the winding ("current exit side"). In the prior art, one of these wire ends was connected indiscriminately to one of the slip rings 10a or 10b, while the other wire end was connected to the other slip ring.

It has however been found that the behaviour of the alternator in the presence of electromagnetic perturbations, for example radiated by radio emissions, and more particularly in the frequency modulation wave band, is influenced to a significant extent by the way in which the ends of the excitation winding are connected to the potentials supplied by the regulator circuit of the alternator. In the arrangement shown in the drawings, the arrangement is such that the inner end of the winding (i.e. that which is closer to the alternator shaft, corresponding to the beginning of the winding during its formation) is connected to that terminal of the regulator which delivers a fixed potential corresponding to a predetermined one of the slip rings 10a and 10b; while the terminal of the regulator that delivers the variable potential corresponding to the other slip ring of the collector, will be connected to the outer end of the winding (i.e. the final end of the winding).

The notches 30, 30' and 30" enable these connections to be made in pairs, with the correct angular position of the slip ring unit 1, selected from its two possible positions offset by 180°, being determined for example by one or more feelers associated with the automatic assembly equipment, or again visually during manual operations.

After the moulding operation has been completed, the body of the slip ring unit I has two branches of plastics material, indicated at 32a and 32b in FIG. 1. The conductive linking portions 122a, 123a and 122b, 123b respectively are completely encapsulated in these two branches. The unit 1 also includes a ring-shaped portion 34 having an axis coincident with that of the cylindrical portions 10, 20 and 22, being connected to these latter portions through the branches 32a and 32b and lying at the level of the connecting elements 14a and 14b. More precisely, each branch 32a, 32b comprises a straight portion, 321a, 321b respectively, and a portion 322a, 322b respectively, curved through 90° and following the shape of the curved intermediate portions 123a and 123b of conductive material. The branches 32a and 32b are joined radially, and in positions diametrically opposed to each other, to the ring portion 34 at the level of the connecting elements 14a and 14b.

It will be observed that each branch 32a, 32b is formed with an outward shoulder, indicated at 323a and 323b respectively, in the transition region between its straight portion and its curved portion.

The inner face of each straight portion 321a, 321b constitutes an axial extension of the inner face of a respective one of the splined grooves 26, 26' in the bore 24, while the outer face of each straight portion has a profile in the form of an arc of a circle and constitutes an axial extension of the outer face of the cylindrical portion 22.

The ring portion 34 has two thickened portions 341 (see FIG. 4), extending outwardly in two positions which are diametrically opposed to each other and offset by 90° with respect to the connecting elements 14a and 14b. Two slightly concave recesses or concave surface 342 are formed in the respective outer surfaces of the portion 341. The ring portion 34 also has two further thickened portions 343, again extending outwardly and lying at the level of the connecting elements 14a and 14b, in such a way as partially to trap the anchor lugs 1241. Each of these portions 343 again has a recess 344 (FIG. 2), enabling the offset holes 1242 to be left.

The formation of the ring portion 34 during the moulding step enables the slip ring unit 1 to be stiffened in the region of the connection element 14a and 14b, while at the same time guaranteeing that their distance apart in the radial direction is properly set. In this connection, the presence of the cooling fan of the alternator not far from the connecting elements 14a and 14b, after the unit 1 has been force-fitted on to the alternator shaft, makes it necessary to position these elements in a very precise way in the radial direction. In addition, the ring portion 34 satisfactorily prevents any contact occurring between the elements 14a, 14b and an adjacent widened portion of the alternator shaft AR (see FIG. 9) around which the ring portion is positioned, especially when any dilatation effects are taking place due to heating or the accumulation of dust in that region of the alternator.

In addition, the plastics material to be moulded on to the metallic parts of the unit 1 is preferably injected into the mould in the region of the ring portion 34, and in particular in the region of the thickened portions 341 of the latter.

Furthermore, the concave surfaces 342, which are disposed laterally and in diametrically opposed relationship, serve to enable the component to be gripped by an automatic or robotic assembly machine as illustrated schematically through the arrows 1b in FIGS. 2, 3, 4, 5, 7, 8 and 9, for the purpose of force-fitting the slip ring unit on the alternator shaft. Thus the slip ring unit can be picked up in two possible orientations, offset from each other by 180°. It has been explained above how the notches 30, 30' and 30" enable this orientation to be positively chosen to be such that it is suitable for the energisation of the winding in the correct polarity.

It will also be noted that the shoulders 323a and 323b, which project radially outwardly from the cylindrical surface defined by the cylinder 10 and its insulating extension 22, serve, during the assembly of the component on certain types of alternator, as an axial abutment for a ball bearing which is arranged between the shaft of the alternator and its casing, so as to constitute the rear bearing of the alternator.

FIGS. 10 and 11 show a component in the form of a slip ring unit of the kind described above, mounted respectively on two alternators A of different models. The alternator shaft is indicated at AR, and a rolling bearing for this shaft is indicated at R. From FIGS. 10 and 11, the function of the ring portion 34 will be understood, in that it prevents any "floating" of the connecting elements 14a and 14b, and also prevents any likelihood of short circuits occurring with the closely adjacent portions of the alternator.

It will also be noted that a lateral plate P of the rolling bearing R is in abutment against the shoulders 323a and 323b defined by the body of the component 1.

The present invention is of course in no way limited to the embodiment described above and shown in the drawings, and the person skilled in this technical field will be able to apply to it any variation or modification in accordance with the spirit of the invention.

What is claimed is:

1. A slip ring unit for force fitting to an alternator that has a shaft and alternator winding wire ends, a rolling bearing for the shaft, the slip ring unit having a molded body comprising a plurality of electrically conductive elements, insulating material molded on to said conductive elements, with the body defining a generally cylindrical first body portion having an outer surface, a second body portion, and an intermediate body portion connecting said first and second body portions together electrically and mechanically, said conductive elements having two slip rings in said first body portion at the outer surface of said body portion and two connecting elements in said second body portion for connecting said slip rings with the wire ends of the alternator, said intermediate portion having two branches, each of said branches having a conductive portion for connecting an associated one of said slip rings with a respective connecting element, said connecting elements being embedded in said insulating material, wherein said second body portion has a ring of insulating material made integrally by molding and defining a diameter substantially greater than that of said cylindrical first body portion, each said branch having a first branch portion extending said cylindrical first body portion, and a second branch portion joined to said first branch portion and being divergent radially up to said respective ring of insulating material, said slip ring having means adapted to be gripped by a robotic machine for force fitting the slip ring unit to an alternator.

2. A slip ring unit according to claim 1, wherein said connecting elements extend radially outwardly to define extensions of said branches.

3. A slip ring unit according to claim 1, wherein said means to be gripped by said robotic machine define two diametrically opposed concave surfaces.

4. A slip ring unit according to claim 3, wherein said slip rings each have integral thickened portions offset by 90° with respect to said connecting elements, said thickened portions defining said concave surfaces.

5. A slip ring unit according to claim 1, wherein said connecting elements further comprise linking portions defining a transition between said connecting elements, said rings have integral thickened portions, and lateral lugs anchored in said thickened portions at said linking portion defined transition.

6. A slip ring unit according to claim 5, wherein said connecting elements and said linking portions define a transition having a hole at said transition, for positioning said connecting element before the body is molded in place.

7. A slip ring unit according to claim 1, wherein each said branch defines an external shoulder for abutment with the rolling bearing for the alternator shaft.

8. A slip ring unit acccording to claim 1, further comprising conductive linking portions for defining a transition between said connecting elements, said linking portions each having a generally U-shaped cross section over at least a portion thereof.

9. A slip ring unit according to claim 1, wherein said generally cylindrical first body portion defines a central bore and two diametrically opposed spline grooves in said bore, each spline groove having internal and lateral surfaces, said branches having internal and lateral surfaces extending those of said spline grooves.

10. A slip ring unit according to claim 1, wherein said second branch portion define a profile generally in a form of a quarter of a circle.

11. A slip ring unit according to claim 1, wherein the alternator shaft protrudes from said body and in which the slip ring unit is fitted on the shaft.

\* \* \* \* \*